Patented June 11, 1940

2,204,357

UNITED STATES PATENT OFFICE 2,204,357

LAMELLAR TRISODIUM PHOSPHATE HYDRATE

Winfield Walter Heckert, Wilmington, Del., assignor to E. I. du Pont de Nemours & Company, Wilmington, Del., a corporation of Delaware No Drawing. Application March 5, 1938,
Serial No. 194,170

6 Claims. (Cl. 23—839)

This invention relates to the manufacture of compositions of matter comprising trisodium phosphate hydrate in the form of relatively large high bulking lamellae, and more particularly to processes for producing such compositions by dissolving a silicate in molten trisodium phosphate hydrate, solidifying the molten material and forming high bulking lamellae.

Various processes are known in the art for flaking trisodium phosphate hydrate. In these processes trisodium phosphate hydrate is melted in its water of crystallization and solidified on a suitably cooled surface in the form of a thin layer and then formed into flakes. In one such process the melt is fed continuously to the surface of a rotating water-cooled drum from which the solidified material is flaked by means of suitable knives or scrapers.

In the operation of these processes it is necessary to make rather dense flakes in order to obtain a material which will not disintegrate into a powder when it is removed from the flaking drum. The formation of this powder is due to the fact that when the molten trisodium phosphate hydrate is chilled on the drum it rapidly crystallizes into a brittle form incapable of being flaked from the drum without considerable disintegration. Efforts to reduce the thickness of the flakes not only result in the production of a large quantity of this fine powder but also in a material reduction in the size of the flakes so that, irrespective of the operating conditions, a product having great bulk cannot be obtained.

I have now found that the tendency of trisodium phosphate hydrate melts to solidify into a brittle crystalline form may be avoided by incorporating silicates in the molten trisodium phosphate hydrate. Thus by dissolving silicates in molten trisodium phosphate hydrate, converting the molten material to a continuous thin, semi-solid film and forming the film into lamellae of suitable high bulking shape or form, I am able to produce a material having greater bulk and greater resistance to mechanical abuse than heretofore possible and at the same time to avoid the disadvantage of the forming of large quantities of powdered material.

By converting molten trisodium phosphate hydrate containing a silicate on a water-cooled drum to a thin, semi-solid film and stripping the partially solidified material from the drum with suitable knives, I am able to produce trisodium phosphate hydrate in the form of thin, curly, somewhat lace-like flakes bulking 85 cubic inches per pound and more. These flakes are entirely different in form and appearance from the ordinary flakes. The latter are stolid, flat, and somewhat brittle with little or no curvature except as may have been imparted by the curvature of the flaking drum whereas the flakes of this invention are thin, curly, and somewhat lace-like in appearance. They are plastic as stripped from the roll and quickly harden to strong flakes.

This difference in the character of the flakes may be attributable to the difference in the flaking procedure. Thus where the ordinary flakes were of necessity stripped from the flaking drum after complete solidification, the flakes of this invention are stripped while the film on the flaking drum is still in semi-solid state. Thus the film tends to curl during stripping so that shapes entirely apart from the curvature of the drum are imparted to the resulting flakes.

Notwithstanding the thin, curly form of these flakes, they offer superior resistance to mechanical abuse and may be packaged in cartons or barrels, shipped and handled under adverse conditions without any substantial reduction in size or the formation of powder.

Various silicates in various quantities may be employed for this purpose. For example, I have obtained good results with sodium silicates having an $SiO_2/Na_2O$ ratio of 0.97, 1.95, 3.25, and 3.9. Similarly, good results have also been obtained with potassium silicates. The precise nature of the silicate is of relatively small importance as the effects obtained are largely proportional to the $SiO_2$ content. I prefer, however, to employ the soluble silicates such as the alkali metal silicates, so as not to interfere appreciably with the solubility of the trisodium phosphate hydrate.

Alkali metal silicates when dissolved in a melt of trisodium phosphate hydrate in various amounts will inhibit the crystallization of the trisodium phosphate hydrate sufficiently to permit the formation of thin, curly flakes which rapidly harden sufficiently to retain their shape and high bulking form. The amount required for this purpose is not particularly critical as satisfactory flakes may be obtained over a wide range. For example, satisfactory flakes have been obtained with melts containing 7, 12, 20, 25, 33, and 40 per cent sodium metasilicate crystals ($Na_2SiO_3 \cdot 5H_2O$) having an $SiO_2/Na_2O$ ratio of 0.97 and analyzing 29.2 per cent $Na_2O$ and 28.3 per cent $Si_2O$, the balance being water. The 7 and 12 per cent melts gave considerable improvement, tho less than that desired for commercial operations. The melts containing 33 and 40 per cent gave so much inhibition that the flakes were somewhat soft when scraped off the flaking drum. The latter, however, may be used to good effect when the flaking drum is operated at a lower rate of speed in order to give a longer period for the material to set before flaking.

Similarly good results have been obtained with the following silicates:

1. $SiO_2/Na_2O$ ratio 1.95, composition 18.1 per cent $Na_2O$, 35.3 per cent $Si_2O$, the balance water.
2. $Si_2O/Na_2O$ rate 3.25, composition 9.1 per cent $Na_2O$, 29.6 per cent $Si_2O$, the balance water.
3. $Si_2O/Na_2O$ ratio 3.9, composition 6.2 per cent $Na_2O$, 24.2 per cent $SiO_2$, the balance water.
4. $SiO_2/K_2O$ ratio 2.5, composition 8.3 per cent $K_2O$, 20.7 per cent $SiO_2$, the balance water.

As previously indicated, the effect of the various silicates appears directly proportional to the $SiO_2$ content, as illustrated in the following table:

| Silicate used | Percent $SiO_2$ in the melt | | | |
|---|---|---|---|---|
| | Some improvement | Fair flakes | Good flakes | Flakes too soft |
| Metasilicate $Si_2O/Na_2O = 0.97$ | 2.0 | 3.4 | 5.7 and 7.1 | 9.3 and 11.3 |
| #1 silicate $Si_2O/Na_2O = 1.95$ | | 2.5 | 4.2 and 8.8 | 14.1 |
| #2 silicate $Si_2O/Na_2O = 3.25$ | 2.1 | 3.0 and 3.5 | 7.4 | 13.3 |
| #3 silicate $Si_2O/Na_2O = 3.9$ | 1.7 | 2.9 | 6.0 and 8.5 | |
| #4 silicate $SiO_2/K_2O = 2.5$ | 1.4 | 2.5 | 5.2 | |

These data clearly show that the effect of silicates is proportional in the $SiO_2$ content.

vary somewhat in accordance with the specific conditions obtaining, particularly with respect to the rate of flow of the melt to the drum, with the speed of the drum, the rate of solidifying, moisture content and the like. Flakes bulking from 85 to 95 cubic inches per pound or more may be obtained consistently as compared with a maximum bulkiness of less than 60 cubic inches per pound for flakes obtainable from melts containing trisodium phosphate hydrate alone in ordinary operation, and flakes bulking as high as 120 cubic inches per pound may be obtained with more careful operation.

Flakes prepared according to the above procedure are also superior to ordinary flakes in that they do not lose water as readily or pick up carbon dioxide as rapidly as ordinary flakes. This is illustrated by the following table:

| Composition of the melt | Water content | | | $CO_2$ content | | |
|---|---|---|---|---|---|---|
| | When prepared | After 1 week | After 26 days | When prepared | After 1 week | After 26 days |
| Trisodium phosphate hydrate+10% #2 silicate ($SiO_2/Na_2O=3.25$) | Per cent 47 | Per cent 41 | Per cent 36 | Per cent 0.9 | Per cent 1.3 | Per cent 2.7 |
| Trisodium phosphate hydrate+7½% #1 silicate ($SiO_2/Na_2O=1.95$)+2½% water | 46 | 42 | 35 | 0.9 | 1.6 | 3.1 |
| Trisodium phosphate hydrate+13¼% #4 silicate ($SiO_2/K_2O=3.5$)—3¼% water | 49 | 41 | 31 | 1.1 | 1.8 | 3.7 |
| Trisodium phosphate hydrate alone | 50 | 41 | 22 | 0.8 | 1.6 | 5.5 |

While superior results are obtained from melts containing from 5 to 9 per cent $SiO_2$, good results may be obtained with larger or smaller amounts. From a commercial standpoint, however, it is preferable to operate within the limits 2.5 to 9 per cent $SiO_2$.

It will, of course, be apparent to those skilled in the art that the water content of the melt should be maintained within certain limits to obtain satisfactory flaking. While this may be determined readily for any given set of conditions, I have found that satisfactory results may be obtained with melts containing from 50 to 60 per cent of water. Somewhat better flakes are obtained with melts containing 55 to 58 per cent water, but the difference is slight, and may differ somewhat according to the particular conditions obtaining.

It will also be apparent that during the flaking operation considerable water is lost and that the freshly prepared flakes will contain less water than that specified for preparing the melt. Moreover, the flakes gradually lose water during storage. Consequently, the composition of flakes insofar as the water content is concerned will vary considerably from the composition of the melt. The relative proportions of solids, however, will remain substantially the same. Thus for melts containing from 2.5 to 9 per cent $SiO_2$ it will be evident that the flakes produced will have a ratio of $SiO_2/Na_3PO_4$ from 6:100 to 40:100.

The properties of the flakes produced naturally

While I have disclosed my invention specifically with reference to the production of thin, curly, flakes bulking more than 85 cubic inches per pound, it will be understood that numerous variations may be made in the form of the product without departing from the spirit of the invention. Alkali metal silicates may be employed to modify trisodium phosphate hydrate melts whenever it is desired to form the solidified material into particular shapes. This invention, however, is particularly advantageous in producing high bulking lamellae as the lamellar form, being characterized as it is by one dimension being extremely small with respect to the other two and consequently by a high ratio of surface to mass, can be obtained only with difficulty by processes heretofore available and then only in the form of flat plate-like flakes. By this invention lamellae may be formed in various shapes, such as the thin, curly flakes previously described, so as to impart great bulk to the product.

I claim:
1. In a process for flaking trisodium phosphate hydrate the method of obtaining thin, curly flakes bulking more than 70 cubic inches per pound which comprises preparing a melt consisting essentially of alkali metal silicate, trisodium phosphate, and water in proportions to give 5 to 9 per cent soluble $SiO_2$ and about 50 to 58 per cent water, casting the melt into a thin, semi-solid film on a flaking drum and stripping the film from said drum while it is in a semi-solid state and amenable to plastic deformation whereby the film curls during stripping and breaks up into thin, curly flakes having a shape entirely distinct from the curvature of the flaking drum.

2. In a process for flaking trisodium phosphate hydrate the method of obtaining thin, curly flakes bulking more than 70 cubic inches per pound which comprises preparing a melt consisting essentially of an alkali metal silicate, trisodium phosphate, and water in proportions to give 2.5 to 9 per cent soluble $SiO_2$ and about 50 to 60 per cent water, casting the melt into a thin, semi-solid film on a flaking drum and stripping the film from said drum while it is in a semi-solid state and amenable to plastic deformation whereby the film curls during stripping and breaks up into thin, curly flakes having a shape entirely distinct from the curvature of the flaking drum.

3. A flaked product composed essentially of trisodium phosphate, alkali metal silicate and water of crystallization having the composition which results from flaking a melt containing 5 to 9 per cent soluble $SiO_2$ and about 55 to 58 per cent water and having the form resulting from casting the melt into a thin, semi-solid film on a flaking drum and stripping the film from said drum while it is in a semi-solid state and amenable to plastic deformation, said form characterizing the product as thin, curly, somewhat lace-like flakes bulking at least 85 cubic inches per pound.

4. A flaked product composed essentially of trisodium phosphate, alkali metal silicate and water of crystallization having the composition which results from flaking a melt containing 2.5 to 9 per cent soluble $SiO_2$ and about 50 to 60 per cent water and having the form resulting from casting the melt into a thin, semi-solid film on a flaking drum and stripping the film from said drum while it is in a semi-solid state and amenable to plastic deformation; said form characterizing the product as thin, curly, somewhat lace-like flakes bulking more than 70 cubic inches per pound.

5. A flaked product composed essentially of trisodium phosphate, alkali metal silicate and water of crystallization having a form characterizing the product as thin, curly, somewhat lace-like flakes bulking at least 85 cubic inches per pound and having an alkali metal silicate content such that the product contains 12 to 40 parts $SiO_2$ for each 100 parts trisodium phosphate.

6. A flaked product composed essentially of trisodium phosphate, alkali metal silicate and water of crystallization in a form characterizing the product as thin, curly, somewhat lace-like flakes bulking more than 70 cubic inches per pound and having an alkali metal silicate content sufficient to provide 6 to 40 parts $SiO_2$ for each 100 parts trisodium phosphate.

WINFIELD WALTER HECKERT.